US009281904B2

(12) United States Patent
Wellbrock et al.

(10) Patent No.: US 9,281,904 B2
(45) Date of Patent: Mar. 8, 2016

(54) ACTIVE BACKPLANE DESIGNS

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 408 days.

(21) Appl. No.: 13/586,357

(22) Filed: Aug. 15, 2012

(65) Prior Publication Data

US 2014/0049931 A1    Feb. 20, 2014

(51) Int. Cl.
*H04B 10/80* (2013.01)
*H04Q 1/02* (2006.01)
*G02B 6/43* (2006.01)

(52) U.S. Cl.
CPC .......... *H04B 10/801* (2013.01); *H04Q 1/155* (2013.01); *G02B 6/43* (2013.01)

(58) Field of Classification Search
CPC ....................................... H05K 7/10
USPC ........................................... 361/788
See application file for complete search history.

(56) References Cited

U.S. PATENT DOCUMENTS

| 7,458,815 | B2 * | 12/2008 | Fallah-Adl | H05K 7/145 361/695 |
| 2009/0310914 | A1 * | 12/2009 | Sasaki | G02B 6/4292 385/32 |
| 2010/0061069 | A1 * | 3/2010 | Cole | 361/761 |
| 2011/0080719 | A1 * | 4/2011 | Jia | 361/803 |
| 2011/0188417 | A1 * | 8/2011 | Pettus et al. | 370/310 |

* cited by examiner

*Primary Examiner* — Jenny L Wagner
*Assistant Examiner* — Michael P McFadden

(57) ABSTRACT

A backplane device may include an electrical bus, an optical fabric, and a plurality of card sockets. A particular one of the plurality of card sockets may include a first socket configured to receive a first electrical connector of a card and electrically connect the first electrical connector to the electrical bus; and a conversion device comprising a second socket configured to receive a second electrical connector of the card; and an optical transceiver configured to convert electrical signals received from the second electrical connector to optical signals and provide the optical signals to the optical fabric; and convert optical signals received from the optical fabric to electrical signals and provide the electrical signals to the second electrical connector.

20 Claims, 11 Drawing Sheets

ACTIVE BACKPLANE DESIGNS

BACKGROUND INFORMATION

Networking equipment may include network cards that include electrical components mounted on a circuit board. Multiple network cards may be mounted onto a chassis frame in a rack system. The rack system may provide a space-efficient way to store and organize network cards and may provide electromagnetic shielding for the network cards. Furthermore, the cards may be connected to a backplane. The backplane may include a bus that enables individual cards to communicate with each other. As communication systems increase in complexity, the number of cards that may be included in a rack may continue to increase. Furthermore, the amount of data exchanged between cards in a rack system, as well as the speeds at which the data is exchanged, may also continue to increase. Rack system designs may have trouble keeping up with increasing data speeds.

DETAILED DESCRIPTION OF PREFERRED EMBODIMENTS

Figure 1A:
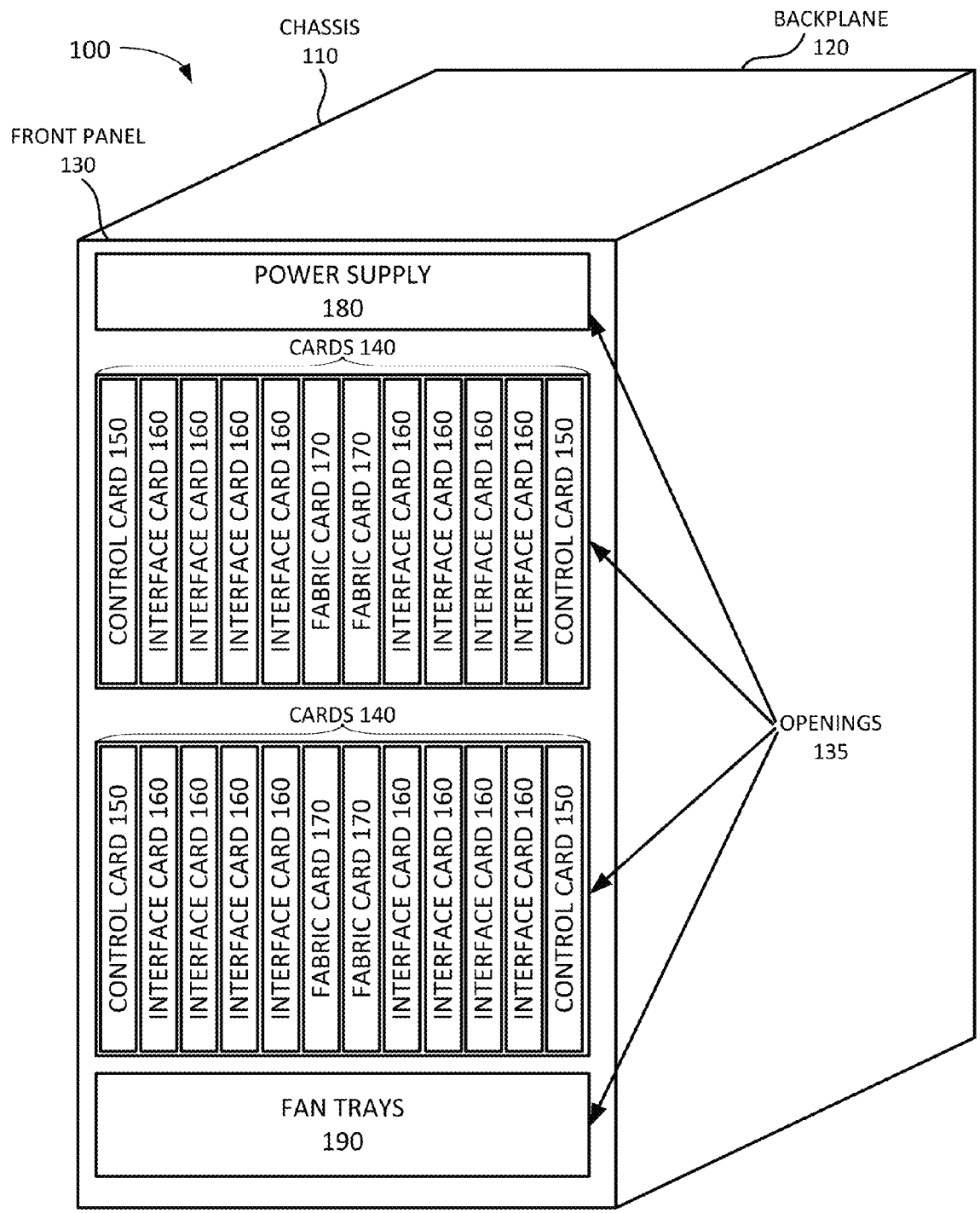
FIG. 1A is a diagram illustrating an exemplary rack system according to an implementation described herein.

The following detailed description refers to the accompanying drawings. The same reference numbers in different drawings identify the same or similar elements.

Backplanes may provide interconnections between network cards in a rack system via an electrical bus. A backplane may include a large number of slots for accommodating network cards, and may therefore include a large number of electrical traces or electrical connections. However, as data transfer rates increase, the attenuation of signals in the electrical connections may increase beyond acceptable levels. An active backplane may provide optical connections between cards. Optical connections may not suffer from the attenuation problems experienced by electrical connections. However, providing an optical connection between a card and a backplane may generate other problems. For example, the air flow necessary for cooling a rack system with a large number of interface cards may introduce dust or other contaminants that may contaminate an optical connection between a card and a backplane. Thus, it may be necessary to periodically clean the optical connection. However, the optical connection may be hard to reach with a cleaning tool and the card may need to be removed to service the optical connection, resulting in an interruption of the functionality of the card.

An implementation described herein relates to a backplane that includes a conversion device for converting electrical signals received from a card to optical signals in a backplane and for converting optical signals in the backplane to electrical signals to be provided to the card. The backplane may include an electrical bus configured to provide low speed electrical connections between cards and may include an optical fabric to provide high speed electrical connections between the cards. Card sockets included in the backplane may include a first electrical connector configured to provide an electrical connection to the electrical bus and a second electrical connector configured to provide an electrical connection to a conversion device. The conversion device may connect to the optical fabric and may convert electrical signals received via the second electrical connector to optical signals and may provide the optical signals to the optical fabric, and may convert optical signals received via the optical fabric to electrical signals and may provide the electrical signals to the second electrical connector.

Another implementation described herein relates to a backplane that includes an electrical bus and one or more openings for enabling optical fibers to be connected between cards. Thus, card sockets included in the backplane may include a first electrical connector configured to provide an electrical connection to the electrical bus and one or more openings adjacent to the first electrical connector. A card may be connected to the electrical bus via the first electrical connector and may include an optical connection to an optical fiber that may be passed through an opening of the one or more openings and connected to another card using the optical fiber via the same opening or another opening. The optical connection may be made via optical connectors or via a pluggable optical transceiver, such as a small form-factor pluggable transceiver (SFP).

FIG. 1A is a diagram illustrating an exemplary rack system 100 according to an implementation described herein. As shown in FIG. 1A, rack system 100 may include a chassis 110, a backplane 120, and a front panel 130. Chassis 110 may include a metal frame that may provide structural stability to rack system 100 and may provide electromagnetic shielding to cards installed in rack system 100. Backplane 120 may be configured to enable cards installed in rack system 110 to communicate with each other. For example, backplane 120 may include a printed circuit board (PCB) mounted to a frame for structural stability. The PCB may include card sockets that may be connected to an electrical bus via a set of first connectors and to an optical fabric via a set of second connectors.

Front panel 130 may include openings 135 for receiving cards 140. Front panel 130 may provide a space efficient way to organize and store cards 140 (referred to herein collectively as "cards 140" and individually as "card 140"). Card 140 may include a structural frame that holds a PCB. The PCB may include electrical components, such as integrated circuit (IC) chips, passive electrical components, and/or electrical traces that interconnect the electrical components. The IC chips may include processors, application-specific integrated circuits (ASICs), field-programmable gate arrays (FPGA), and/or another type of integrated circuit or processing logic; memory devices such as a random access memory (RAM) or another type of dynamic storage device, a read-only memory (ROM) device or another type of static storage device, a content addressable memory (CAM), a magnetic and/or optical recording memory device and/or another type of memory. Furthermore, card 140 may include a set of front connectors that may enable card 140 to be connected to other devices via electrical and/or optical cables through front panel 130. Moreover, card 140 may include a set of back connectors to connect card 140 to backplane 120.

Card 140 may correspond to a control card 150, an interface card 160, a fabric card 170, and/or another type of card. Control card 150 may perform control, management, and/or power functions for other cards 140 installed in rack system 100. For example, control card 150 may manage distribution of power to other cards 140 and may monitor alarms, functionality, and/or performance of cards 140. A first control card 150 may function as an active control card and a second control card 150 may function as a backup control card.

Interface card 160 may include a programmable interface card. For example, interface card 160 may include an optical interface card (e.g., a Synchronous Optical Networking (SONET) interface card), an Ethernet interface card, a Gigabit Ethernet interface card, a Wide Area Network (WAN) interface card, an Asynchronous Transfer Mode (ATM) interface card, a Frame Relay interface card, a T-carrier interface card (e.g., a Digital Signal (DS) card, such as a DS0, DS1, or a DS3 card), a wireless access point interface card, and/or another type of programmable interface card.

Fabric card 170 may include a switching mechanism to switch data between interface cards 160. For example, fabric card 170 may include a single or multi-stage switch of crossbar elements. Additionally or alternatively, the switching mechanism may include one or more processors, one or more memories, and/or one or more paths that permit communication between interface cards 160.

While FIG. 1A illustrates a particular arrangement and numbers of control cards 150, interface cards 160, and fabric cards 170, other implementations of rack system 100 may include a different and/or arrangement of control cards 150, interface cards 160, and/or fabric cards 170. Furthermore, while FIG. 1A illustrates two rows of cards 140, other implementations of rack system 100 may include a single row of cards 140 or more than two rows of cards 140.

Front panel 130 may also include an opening 135 to accommodate a power supply 180 and another opening 135 to accommodate fan trays 190. Power supply 180 may provide power to backplane 120, to cards 140, and to fans installed in fan trays 190. Fan trays 190 may include one or more fans that may provide an air flow across cards 140 in order to cool cards 140.

Figure 1B:
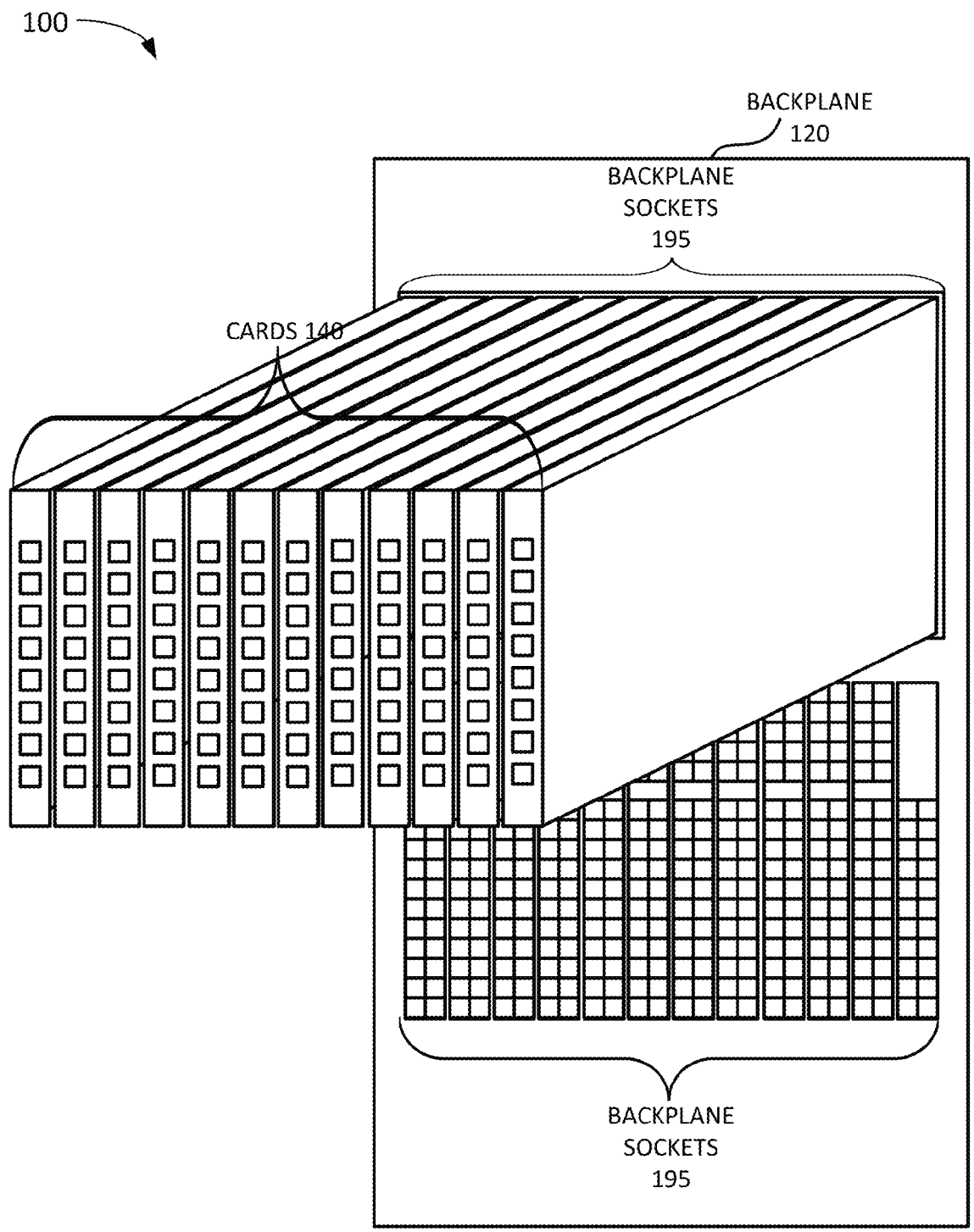
FIG. 1B is a diagram illustrating the rack system of FIG. 1A, with the chassis frame removed, according to an implementation described herein.

FIG. 1B illustrates rack system 100 without chassis 110 or front panel 130, as well as without the lower row of cards 140, in order to illustrate connection of cards 140 to backplane 120. As shown in FIG. 1B, backplane 120 may include backplane sockets 195. FIG. 1B shows cards 140 installed in the top row of backplane sockets 195, while showing the bottom row of backplane sockets 195 without installed cards. Backplane sockets 195 are described in more detail below with reference to FIGS. 2, 3A, and 3B.

Although FIGS. 1A and 1B show exemplary components of rack system 100, in other implementations, rack system 100 may include fewer components, different components, differently arranged components, or additional components than depicted in FIGS. 1A and 1B. Additionally or alternatively, one or more components of rack system 100 may perform functions described as being performed by one or more other components of rack system 100.

Figure 2:
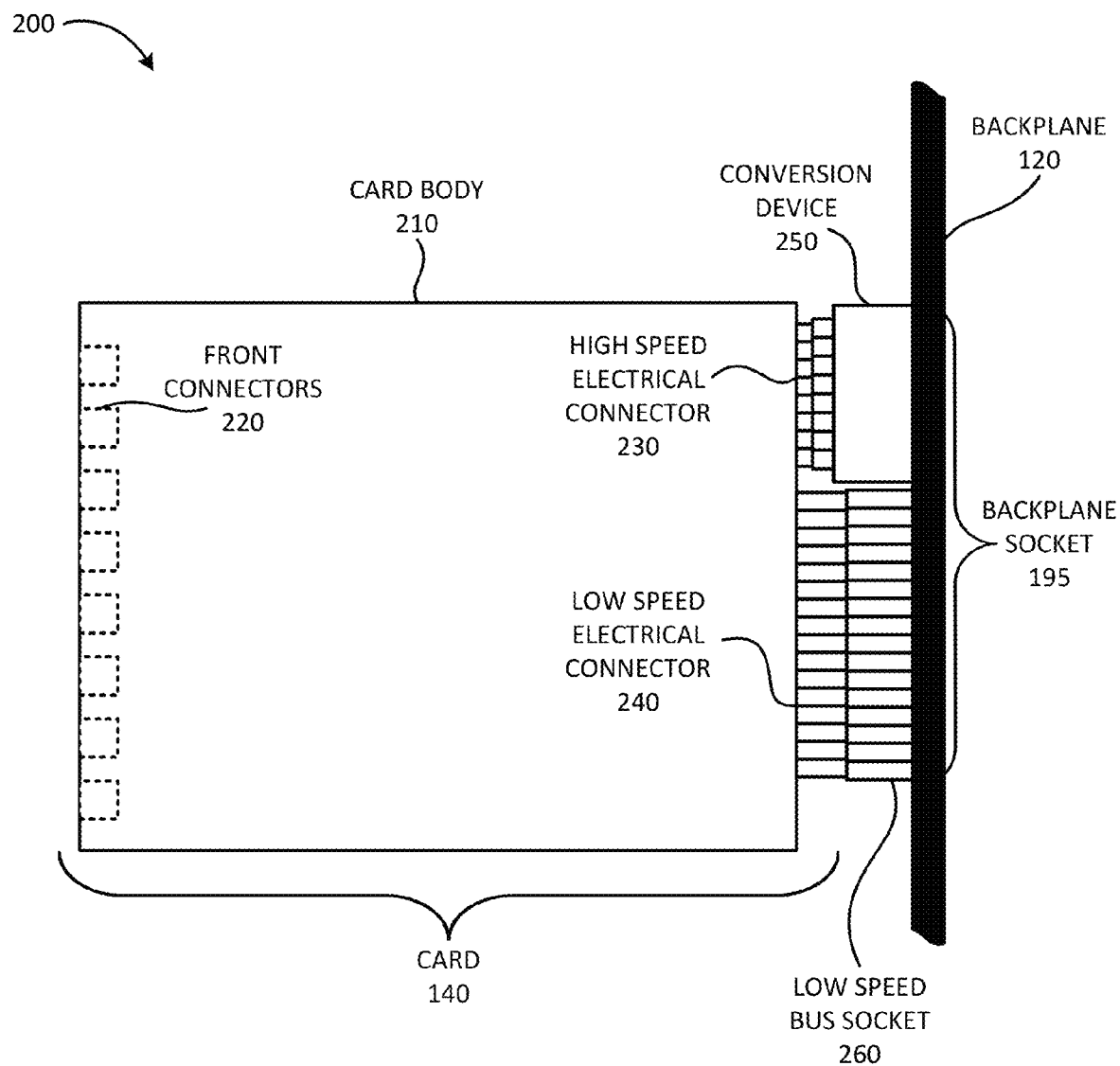
FIG. 2 is a diagram illustrating a first exemplary card connected to an exemplary backplane according to an implementation described herein.

FIG. 2 is a diagram illustrating an assembly 200 of card 140 connected to backplane 120 according to an implementation described herein. As shown in FIG. 2, card 140 may include a card body 210, front connectors 220, a high speed electrical connector 230, and a low speed electrical connector 240. Backplane 120 may include backplane socket 195. Backplane socket 195 may include a conversion device 250 and a low speed bus socket 260.

Card body 210 may include a frame that provides structural support to card 140 and holds a PCB (not shown in FIG. 2) with electrical components, front connectors 220, high speed electrical connector 230, and low speed electrical connector 240. Front connectors 220 may include connectors for attaching cables and/or optical fibers to card 140 via front panel 130. The back connectors of card 140 may include high speed electrical connector 230 and low speed electrical connector 240.

High speed electrical connector 230 may be configured to connect to conversion device 250 of backplane 120. Conversion device 250 may convert electrical signals received from card 140 to optical signals and provide the optical signals to an optical fabric (not shown in FIG. 2), and may convert optical signals received via the optical fabric of backplane 120 to electrical signals and may provide the electrical signals to card 140 via high speed electrical connector 230. High speed electrical connector 230 and conversion device 250 may be used, for example, for communication between interface card 160 and fabric card 170 or between a first fabric card 170 and a second fabric card 170.

Low speed electrical connector 240 may be configured to connect to low speed bus socket 260. Low speed bus socket 260 may receive electrical signals from card 140 via low speed electrical connector 240 and may provide the received electrical signals to an electrical bus (not shown in FIG. 2), and may receive electrical signals from the electrical bus and may provide the received electrical signals to card 140 via low speed electrical connector 240. Low speed electrical connector 240 and low speed bus socket 260 may be used, for example, for communication between control card 150 and interface card 160 or between control card 150 and fabric card 170.

Although FIG. 2 shows exemplary components of assembly 200, in other implementations, assembly 200 may include fewer components, different components, differently arranged components, or additional components than depicted in FIG. 2. Additionally or alternatively, one or more components of assembly 200 may perform functions described as being performed by one or more other components of assembly 200.

Figure 3A:
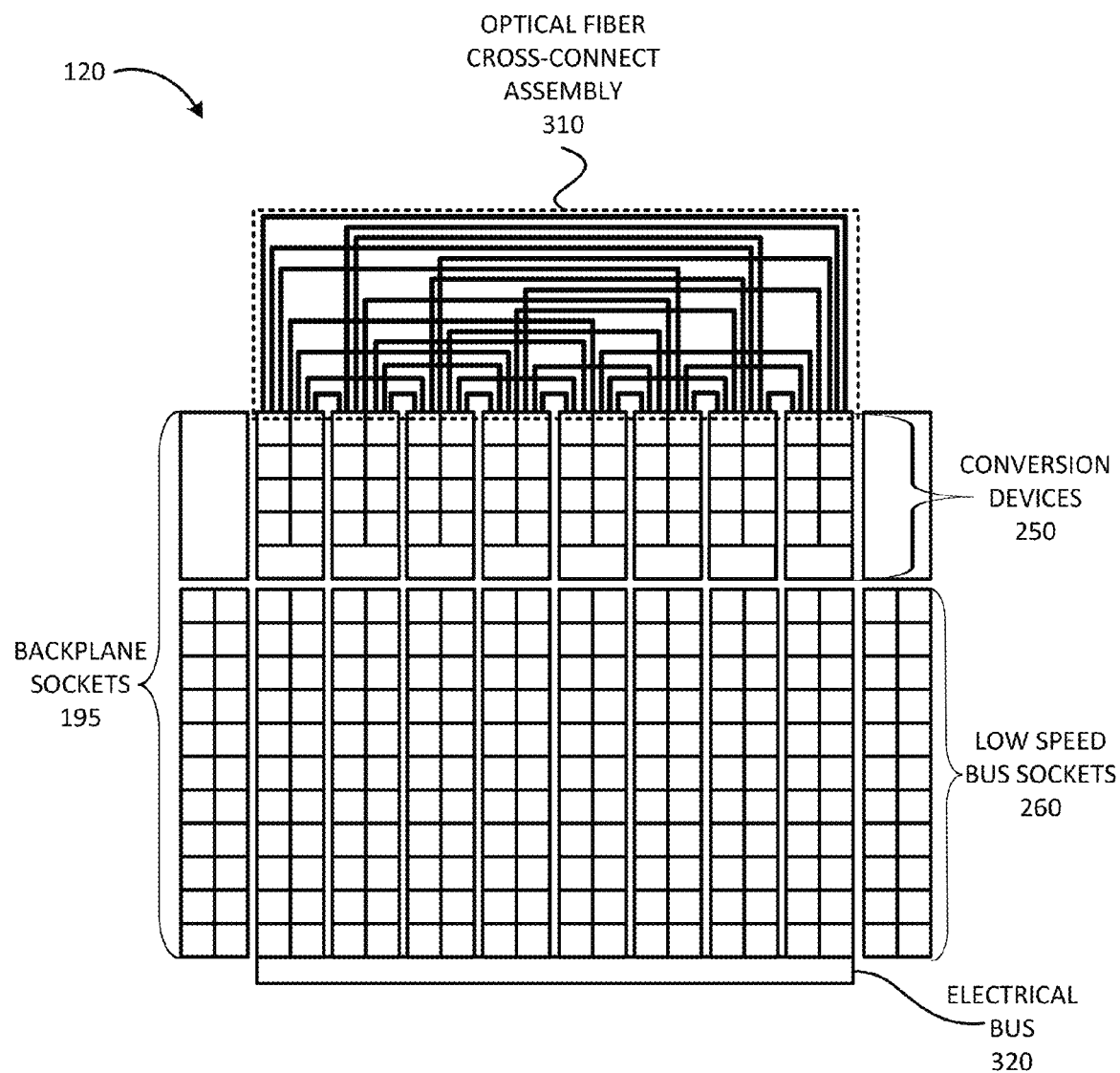
FIG. 3A is a diagram illustrating a first exemplary backplane according to an implementation described herein.

FIG. 3A is a diagram illustrating a first exemplary backplane 120 according to an implementation described herein. First exemplary backplane 120 may interconnect backplane sockets via optical fibers. As shown in FIG. 3A, first exemplary backplane 120 may include backplane sockets 195, optical fiber cross-assembly 310, and electrical bus 320. As shown above with reference to FIG. 2, backplane socket 195 may include conversion device 250 and low speed bus socket 260. Conversion device 250 may be connected to one or more optical fibers of optical fiber cross-connect assembly 310.

Optical cross-connect assembly 310 may include a fiber connection from a first conversion device 250 to a second conversion device 250. In some implementations, optical fiber cross-connect assembly 310 may include a connection from a conversion device 250 to every other conversion device 250. For example, if backplane 120 includes eight conversion devices 250, as shown in FIG. 3A, each conversion device 250 may include seven optical fibers, one to each other conversion device 250. While FIG. 3A illustrates a backplane 120 with eight conversion devices 250 for illustrative purposes, in other implementations, backplane 120 may include a different number of conversion devices 250. Optical fiber cross-connect assembly 310 may be attached to the PCB of backplane 120.

In some implementations, optical cross-connect assembly 310 may include redundant optical fibers. A redundant optical fiber may be an additional optical fiber between a first conversion device 250 and a second conversion device 250. A redundant optical fiber may ensure that if an optical fiber between two backplane sockets 195 malfunctions, a functioning optical connection may still exist between the two backplane sockets 195.

Although FIG. 3A shows exemplary components of first exemplary backplane 120, in other implementations, first exemplary backplane 120 may include fewer components, different components, differently arranged components, or additional components than depicted in FIG. 3A. Additionally or alternatively, one or more components of first exemplary backplane 120 may perform functions described as being performed by one or more other components of first exemplary backplane 120.

Figure 3B:
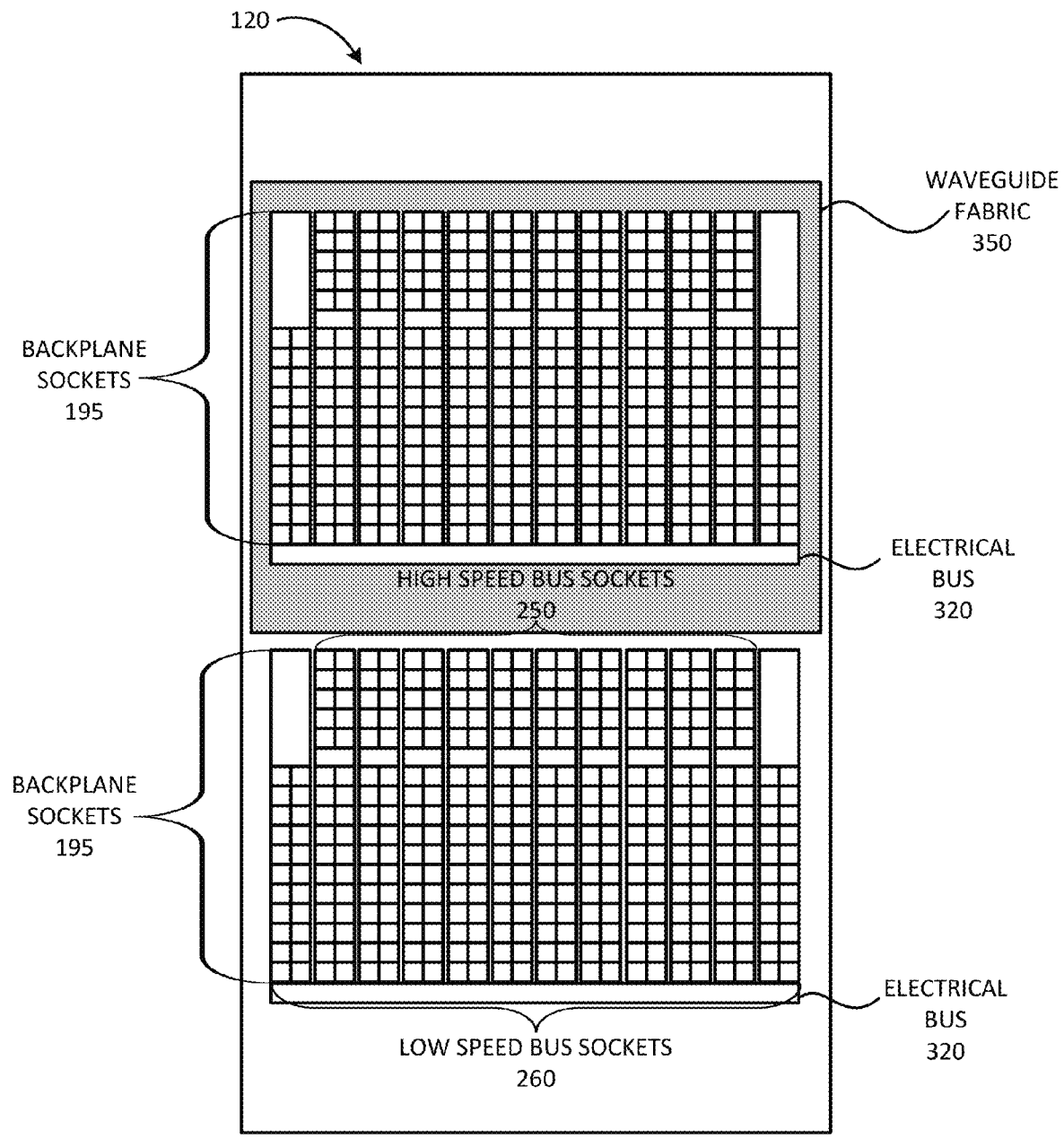
FIG. 3B is a diagram illustrating a second exemplary backplane according to an implementation described herein.

FIG. 3B is a diagram illustrating a second exemplary backplane 120 according to an implementation described herein. Second exemplary backplane 120 may interconnect backplane sockets via a waveguide fabric. As shown in FIG. 3B, first exemplary backplane 120 may include backplane sockets 195 and waveguide fabric 350. Waveguide fabric 350 may include waveguides that interconnect conversion devices 250 of backplane sockets 195.

The waveguides may include planar or strip waveguides, or a combination thereof, and may correspond to single mode or multi-mode waveguides, or a combination thereof. The waveguides may be manufactured from a glass material, a polymer material, a semiconductor material, and/or another type of material. Waveguide fabric 350 may be mounted onto the PCB of backplane 120.

A particular conversion device 250 may include a waveguide connection to each other conversion device 250 on backplane 120. For example, in one implementation, waveguide fabric 350 may include a number of waveguides corresponding to the number of other backplane sockets 195 included in backplane 120. Thus, if backplane 120 includes 12 backplane sockets 195, waveguide fabric 350 may include 11 optical fibers from one conversion device 250, of a first backplane socket 195, to another conversion device 250, of a second backplane socket 195. In another implementation, the number of waveguides may be reduced by the number of backplane sockets 195 designated for control cards 150, as control cards 150 may not need a high speed communication connection. For example, if backplane 120 includes 12 backplane sockets 195, and if two backplane sockets 195 are designated for control cards 150, each conversion device 250 may include 9 waveguides leading to other conversion devices 250. In some implementations, waveguide fabric 350 may include redundant waveguides. A redundant waveguide may ensure that if a waveguide between two backplane sockets 195 malfunctions, a functioning optical connection may still exist between the two backplane sockets 195.

Although FIG. 3B shows exemplary components of second exemplary backplane 120, in other implementations, second exemplary backplane 120 may include fewer components, different components, differently arranged components, or additional components than depicted in FIG. 3B. Additionally or alternatively, one or more components of second exemplary backplane 120 may perform functions described as being performed by one or more other components of second exemplary backplane 120.

Figure 4:
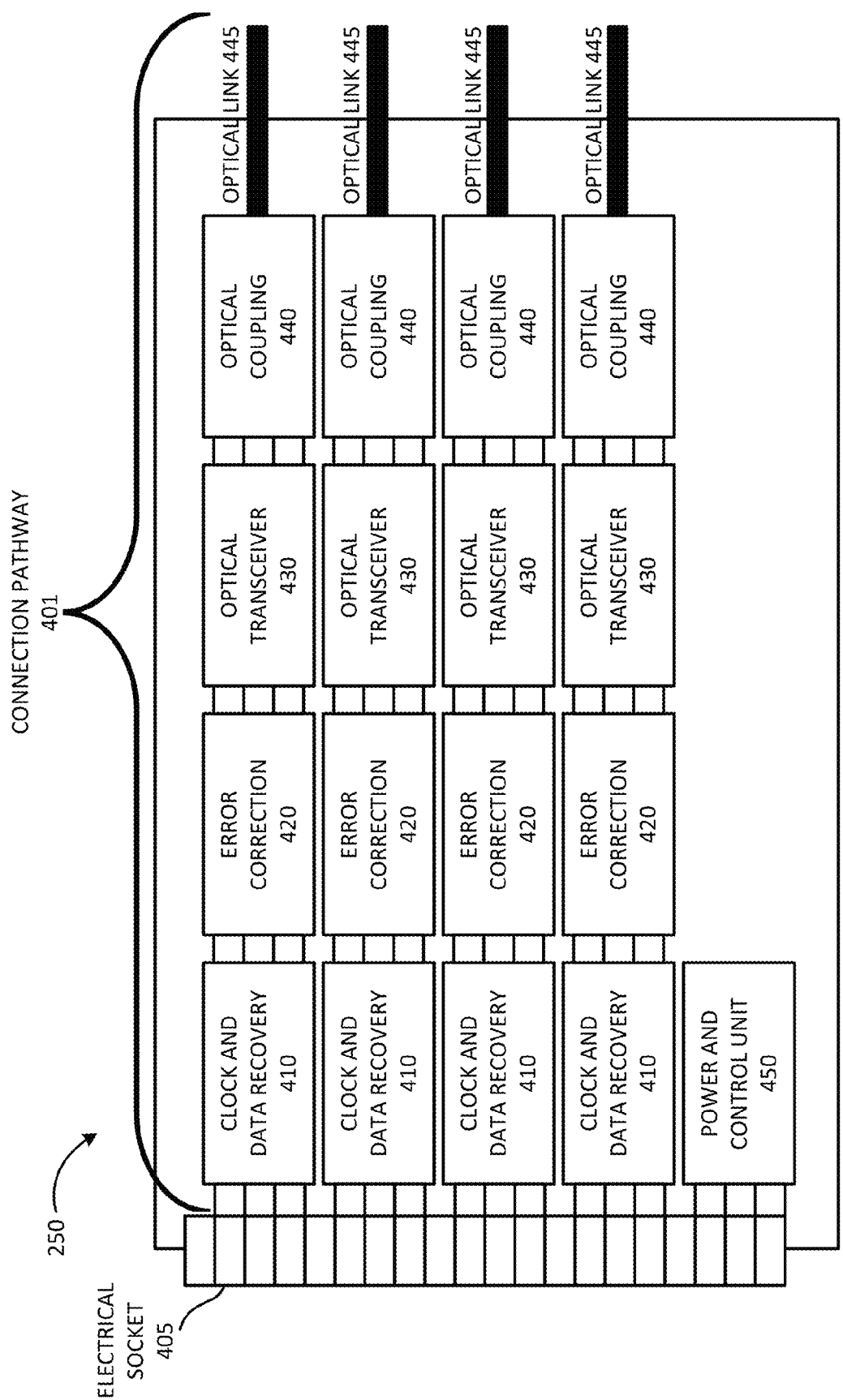
FIG. 4 is a diagram illustrating an exemplary conversion device, included in the backplane, according to an implementation described herein.

FIG. 4 is a diagram illustrating conversion device 250 according to an implementation described herein. As shown in FIG. 4, conversion device 250 may include one or more connection pathways 401 (referred to herein collectively as "connection pathways 401" and individually as "connection pathway 401") and electrical socket 405. Electrical socket 405 may be configured to connect to high speed electrical connector 230 of card 140.

Each connection pathway 401 may connect electrical socket 405 to another conversion device 250. Connection pathway 401 may include a clock and data recovery module 410, an error correction module 420, an optical transceiver 430, an optical coupling 440, and an optical link 445. Clock and data recover module 410 may recover a clock signal from a data signal using, for example, a phased locked loop circuit. Error correction module 420 may perform error correction on the data signal.

Optical transceiver 430 may include an optical transmitter for converting electrical signals into optical signals. For example, optical transceiver 430 may include driver circuitry and a light source, such as a laser light source, a light emitting diode (LED) light source, and/or another type of light source. Furthermore, optical transceiver 430 may include an optical receiver for converting optical signals into electrical signals. For example, optical transceiver 430 may include a photodetector for converting optical signals received via optical link 445 into electrical signals and an amplifier to amplify the converted electrical signals. Optical coupling 440 may provide an optical connection between optical transceiver 430 and optical link 445. Optical link 445 may include an optical fiber (e.g., an optical fiber included in optical fiber bundle 310), a waveguide (e.g., a waveguide included in waveguide fabric 350), or another type of optical connection.

Although FIG. 4 shows exemplary components of conversion device 250, in other implementations, conversion device 250 may include fewer components, different components, differently arranged components, or additional components than depicted in FIG. 4. Additionally or alternatively, one or more components of conversion device 250 may perform functions described as being performed by one or more other components of conversion device 250.

Figure 5:
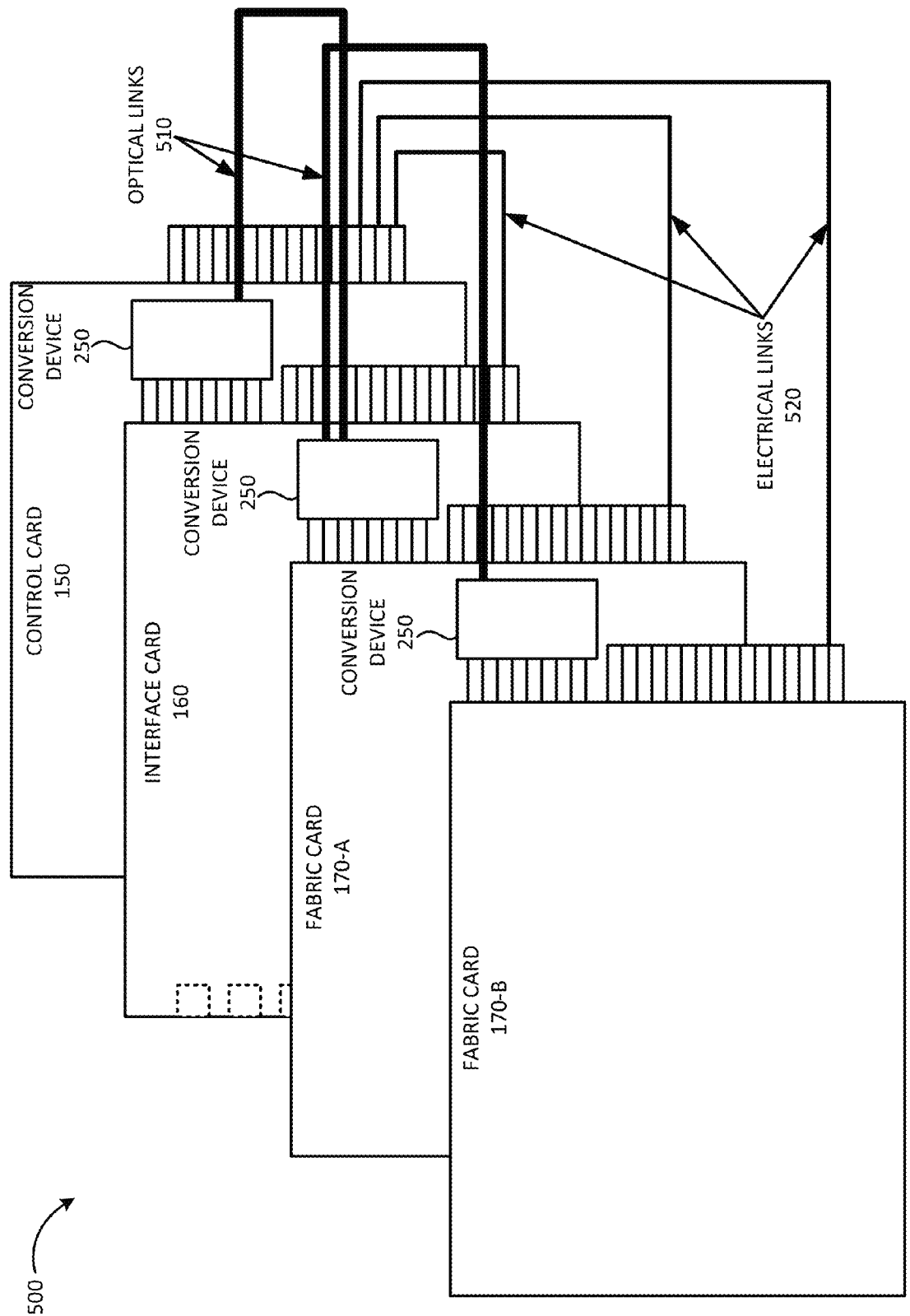
FIG. 5 is a diagram illustrating exemplary interconnections between cards according to an implementation described herein.

FIG. 5 is a diagram illustrating an exemplary card interconnection assembly 500 according to an implementation described herein. Card interconnection assembly 500 may include interconnections between a control card 150, an interface card 160, a first fabric card 170-A and a second fabric card 170-B. Control card 150 may connect to interface card 160 via electrical link 520 using low speed bus sockets 260, may connect to first fabric card 170-A via electrical link 520 using low speed bus sockets 260, and may connect to second fabric card 170-B via electrical link 520 using low speed bus sockets 260.

Connections between interface cards and fabric cards and connections between fabric cards may correspond to high speed connections. Therefore, interface card 160 may connect to first fabric card 170-A via an optical link 510 using conversion devices 250. Furthermore, first fabric card 170-A may connect to second fabric card 170-B via an optical link 510 using conversion devices 250.

Although FIG. 5 shows exemplary components of card interconnection assembly 500, in other implementations, card interconnection assembly 500 may include fewer components, different components, differently arranged components, or additional components than depicted in FIG. 5. Additionally or alternatively, one or more components of card interconnection assembly 500 may perform functions described as being performed by one or more other components of card interconnection assembly 500.

Figure 6:
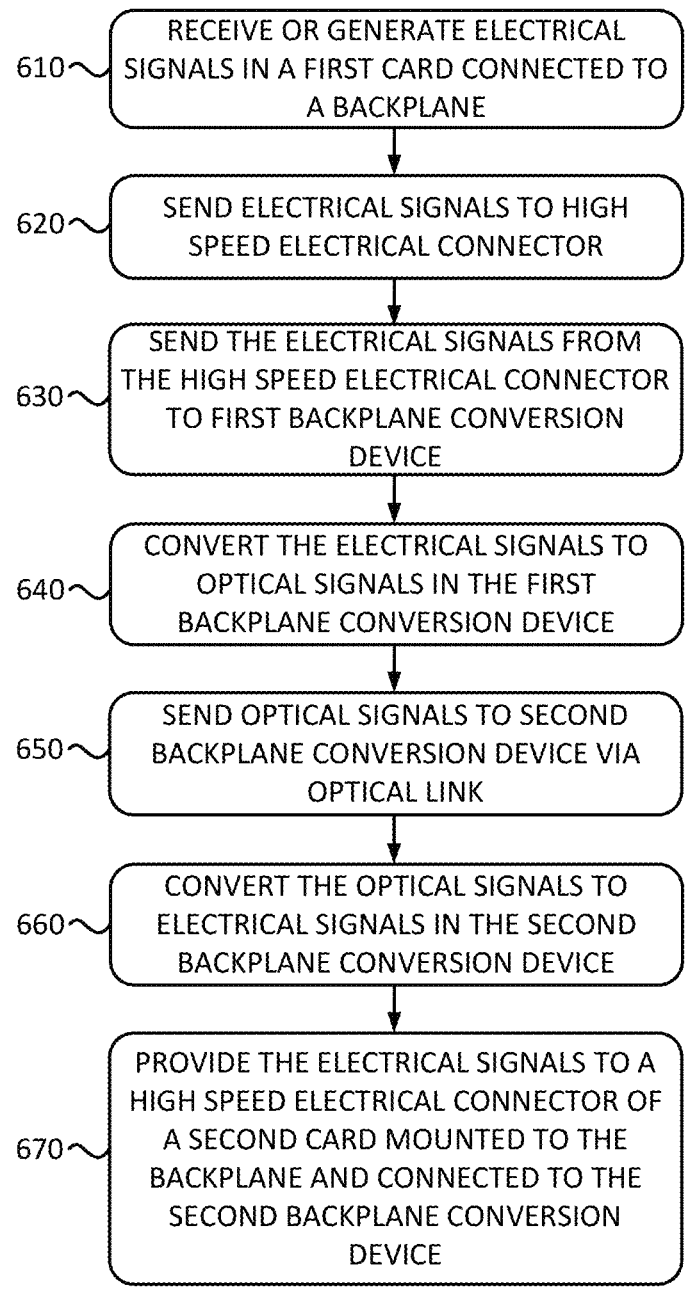
FIG. 6 is a flow chart of an exemplary process for exchanging data between cards according to an implementation described herein.

FIG. 6 is a flow chart of an exemplary process for exchanging data between cards according to an implementation described herein. In one implementation, the process of FIG. 6 may be performed by rack system 100. In other implementations, some or all of the process of FIG. 6 may be performed by another device or a group of devices separate from rack system 100 and/or including rack system 100.

The process of FIG. 6 may include receiving or generating electrical signals in a first card connected to a backplane (block 610). For example, interface card 160 may receive a packet via a link connected to front connectors 220 and may determine that a next destination of the packet is another interface card 160 located in rack system 100. The electrical signals may be sent to a high speed electrical connector (block 620) and the electrical signals may be sent from the high speed electrical connector to a first backplane conversion device (block 630). For example, interface card 160 may provide the packet to high speed electrical connector 230 and high speed electrical connector 230 may provide the packet to a first conversion device 250 connected to interface card 160.

The electrical signals may be converted to optical signals in the first backplane conversion device (block 640) and may be sent to a second backplane conversion device via an optical link (block 650). For example, first conversion device 250 may convert the electrical signals to optical signals and may transmit the optical signals via an optical fiber, or via a waveguide, to a second conversion device 250 connected to a fabric card 170 that switches data traffic between first interface card 160 and second interface card 160.

The optical signals may be converted to electrical signals in the second backplane conversion device (block 660) and the converted electrical signals may be provided to a high speed electrical connector of a second card mounted to the backplane and connected to the second backplane conversion device (block 670). For example, second conversion device 250 may convert the optical signals to electrical signals and may provide the electrical signals to high speed electrical connector 230 of fabric card 170. The fabric card 170 may switch the electrical signals to the second interface card 160 and the process of FIG. 6 may be repeated to transmit the packet from fabric card 170 to the second interface card 160.

Figure 7:
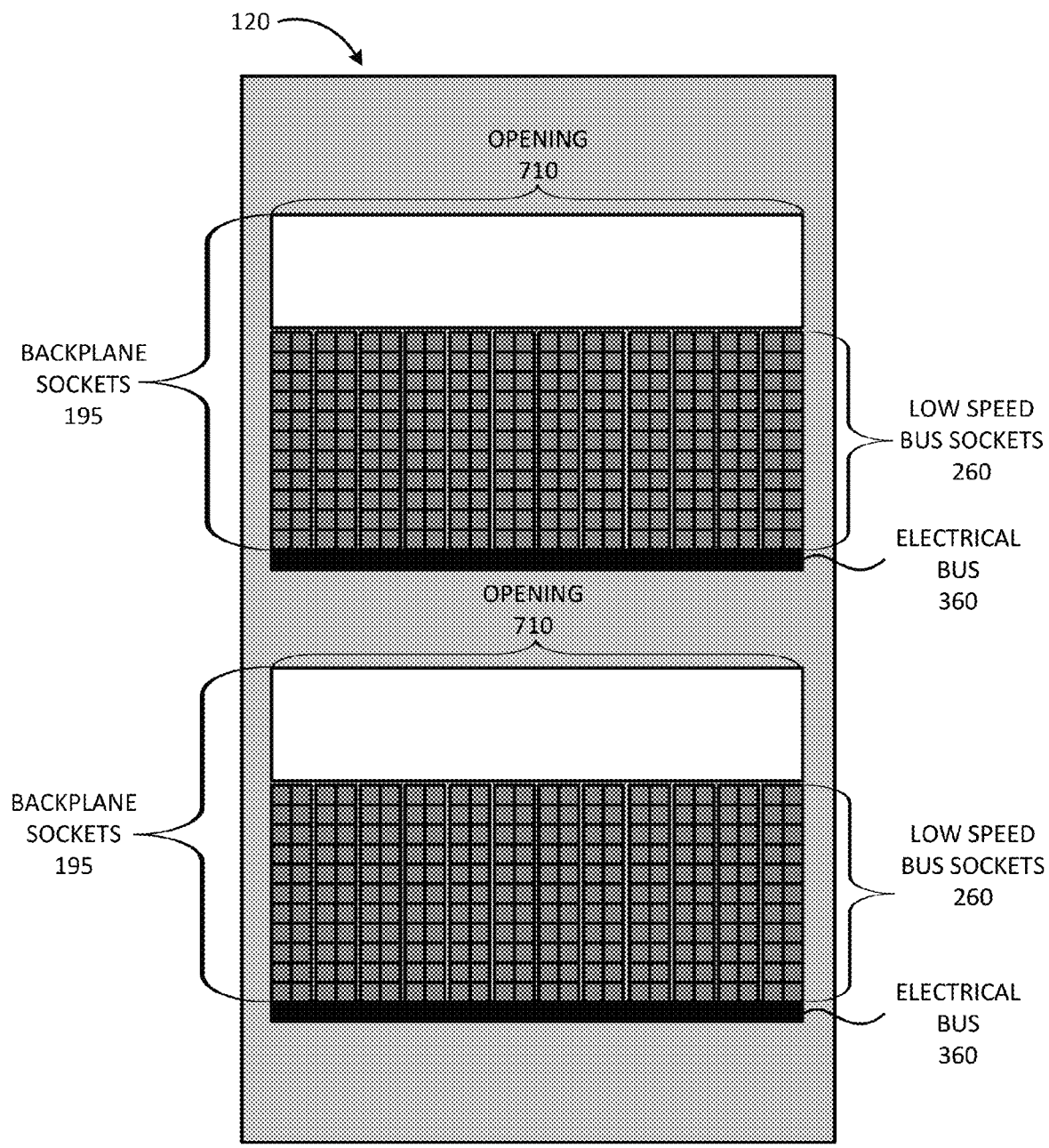
FIG. 7 is a diagram illustrating a third exemplary backplane according to an implementation described herein.

FIG. 7 is a diagram illustrating a third exemplary backplane 120 according to an implementation described herein. Third exemplary backplane 120 may enable optical connections to be made between cards through an opening in third exemplary backplane 120. As shown in FIG. 7, third exemplary backplane 120 may include backplane sockets 195. While two rows of backplane sockets 195 are shown in FIG. 7 for illustrative purposes, in practice, third exemplary backplane 120 may include a different number of rows of backplane sockets 195.

Backplane sockets 195 of third exemplary backplane 120 may include low speed bus sockets 260. Low speed bus sockets 260 may be connected to electrical bus 320 and may enable, for example, a control card 150 to communicate with an interface card 160 and/or a fabric card 170. Furthermore, backplane sockets 195 may include openings 710 (referred to herein collectively as "openings 710" and individually as "opening 710"). Opening 710 may enable an optical fiber to be connected to the back of a first card 140 and the back of a second card 140 to provide an optical connection between the first card 140 and the second card 140. The optical connection may be accessible from the back of rack system 100 for cleaning without requiring removal of cards 140.

Although FIG. 7 shows exemplary components of third exemplary backplane 120, in other implementations, third exemplary backplane 120 may include fewer components, different components, differently arranged components, or additional components than depicted in FIG. 7. Additionally or alternatively, one or more components of third exemplary backplane 120 may perform functions described as being performed by one or more other components of third exemplary backplane 120.

Figure 8:
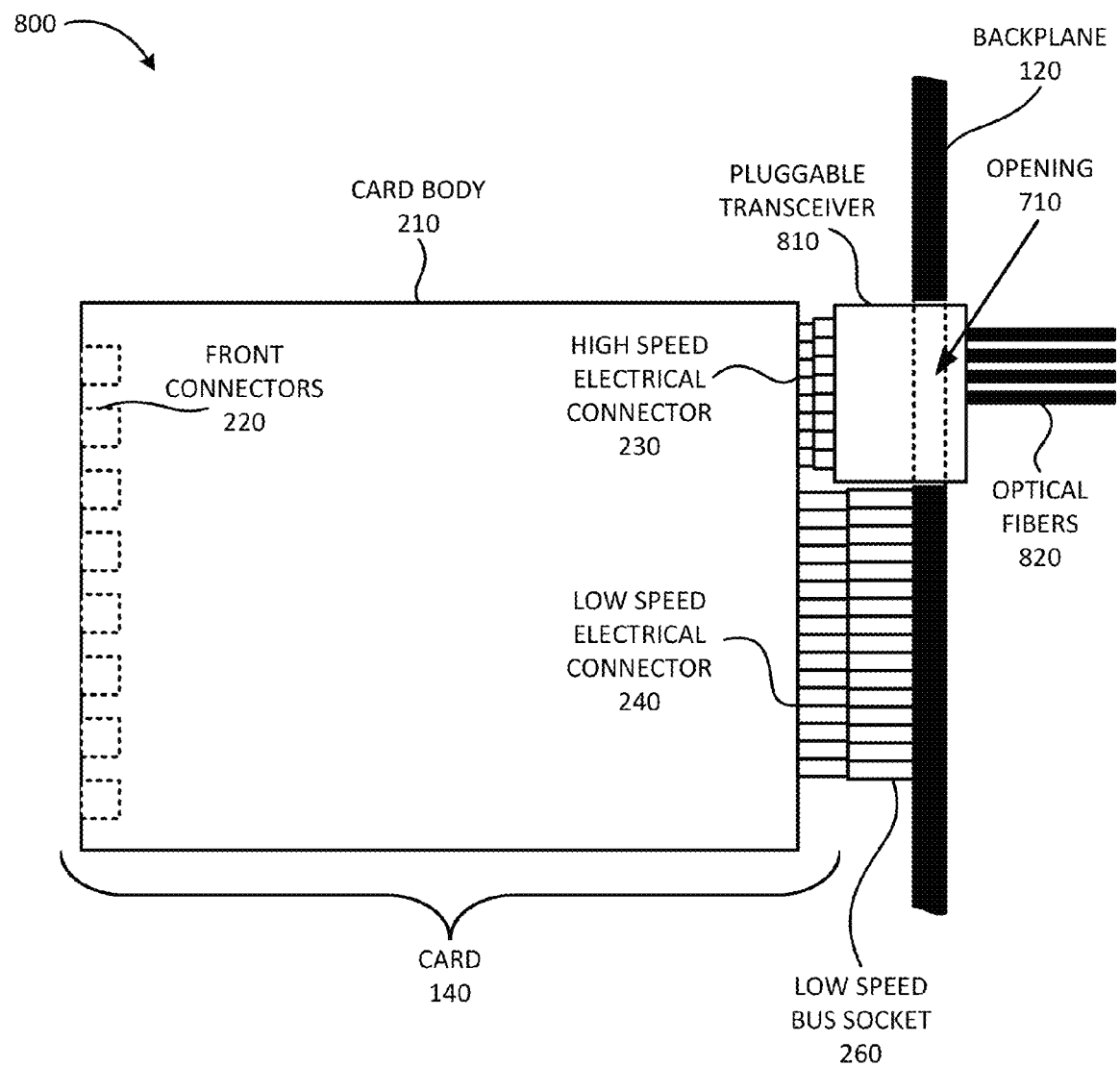
FIG. 8 is a diagram illustrating a second exemplary card connected to an exemplary backplane according to an implementation described herein.

FIG. 8 is a diagram illustrating a first exemplary assembly 800 of card 140 connected to third exemplary backplane 120 using a pluggable transceiver according to an implementation described herein. As shown in FIG. 8, card 140 may include card body 210, front connectors 220, high speed electrical connector 230, and low speed electrical connector 240. High speed electrical connector 230 may be connected to a pluggable transceiver 810. Pluggable transceiver 810 may include an electrical connector to connect to high speed electrical connector 230 on one side and may include an optical connector to connect to optical fibers 820 on the other side (optical connector not shown in FIG. 8). Alternatively, an optical connector may be included within pluggable transceiver 810 and optical fiber 820 may exit the housing of pluggable transceiver 810. Pluggable transceiver may include, for example, a small form-factor pluggable optical transceiver (SFP), a 10 Gigabit small form-factor pluggable transceiver (XFP), a C form-factor pluggable transceiver (CFP), and/or another type of pluggable transceiver. Backplane 120 may include opening 710 and pluggable transceiver 810 may extend through opening 710 when card 140 is installed in backplane 120. Thus, opening 710 may enable an optical connection to be formed between two cards 140 using a pluggable transceiver.

Although FIG. 8 shows exemplary components of assembly 800, in other implementations, assembly 800 may include fewer components, different components, differently arranged components, or additional components than depicted in FIG. 8. Additionally or alternatively, one or more components of assembly 800 may perform functions described as being performed by one or more other components of assembly 800.

Figure 9:
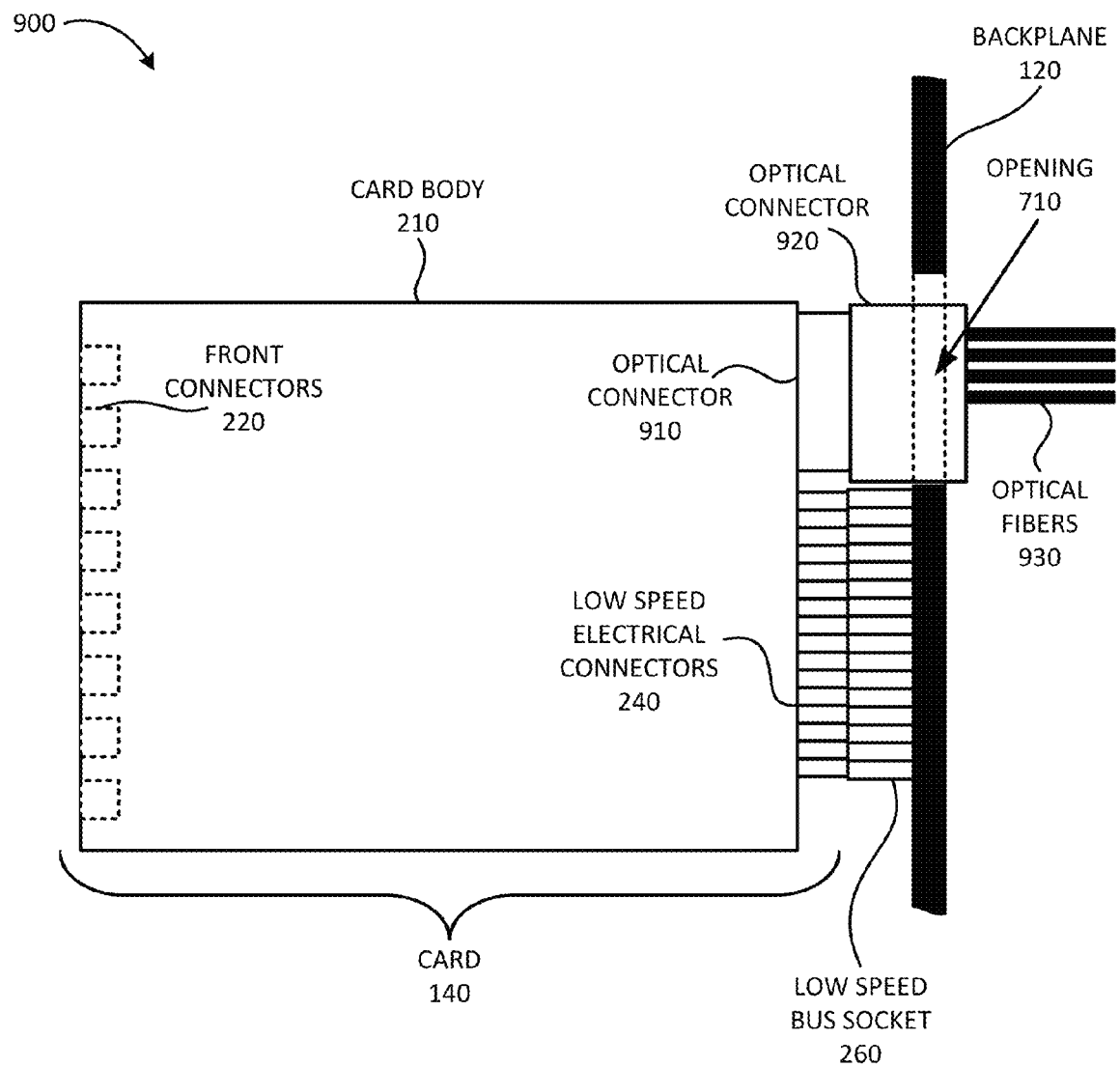
FIG. 9 is a diagram illustrating a third exemplary card connected to an exemplary backplane according to an implementation described herein.

FIG. 9 is a diagram illustrating a second exemplary assembly 900 of card 140 connected to third exemplary backplane 120 using an optical connection according to an implementation described herein. As shown in FIG. 9, card 140 may include card body 210, front connectors 220, low speed electrical connector 240, and optical connector 910. Optical connector 910 may be connected to optical connector 920, which may be attached to optical fibers 930. Backplane 120 may include opening 710 and optical connector 910 and/or optical connector 920 may extend through opening 710 when card 140 is installed in backplane 120. Thus, opening 710 may enable an optical connection to be formed between two cards 140 using optical connectors. Furthermore, the optical connectors may be cleaned without having to remove card 140 from backplane 120.

Although FIG. 9 shows exemplary components of assembly 900, in other implementations, assembly 900 may include fewer components, different components, differently arranged components, or additional components than depicted in FIG. 9. Additionally or alternatively, one or more components of assembly 900 may perform functions described as being performed by one or more other components of assembly 900.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A backplane device comprising:
   an electrical bus;
   an optical fabric; and
   a plurality of card sockets, wherein a particular one of the plurality of card sockets includes:
      a first socket, electrically connected to the electrical bus, and configured to receive a first electrical connector of a card and electrically connect the first electrical connector to the electrical bus; and
      a conversion device, optically connected to the optical fabric and remaining attached to the backplane when the card is removed from the particular one of the plurality of card sockets, the conversion device comprising:
         a second socket configured to receive a second electrical connector of the card; and
         an optical transceiver configured to:
            convert electrical signals received from the second electrical connector to optical signals and provide the optical signals to the optical fabric; and
            convert optical signals received from the optical fabric to electrical signals and provide the electrical signals to the second electrical connector.

2. The backplane device of claim 1, wherein the conversion device further includes:
   a clock and recovery component;
   an error correction component; and
   an optical coupling to connect the optical transceiver to the optical fabric.

3. The backplane device of claim 1, wherein the optical fabric comprises:
   a cross-connect assembly of optical fibers, wherein the cross-connect assembly includes an optical fiber connecting the optical transceiver, included in the particular one of the plurality of card sockets, to optical transceivers included in other ones of the plurality of card sockets.

4. The backplane device of claim 3, wherein the cross-connect assembly of optical fibers includes a redundant fiber connection between the optical transceiver, included in the particular one of the plurality of card sockets, and another optical transceiver, included in another one of the plurality of card sockets.

5. The backplane device of claim 1, wherein the optical fabric comprises:
   a waveguide fabric, wherein the waveguide fabric includes a waveguide connecting the optical transceiver, included in the particular one of the plurality of card sockets, to optical transceivers included in other ones of the plurality of card sockets.

6. The backplane device of claim 5, wherein the waveguide fabric includes a redundant waveguide connection between the optical transceiver, included in the particular one of the plurality of card sockets, and another optical transceiver, included in another one of the plurality of card sockets.

7. A network device comprising:
   a backplane; and
   a plurality of cards connected to the backplane; and
   wherein the backplane includes:
      an electrical bus;
      an optical fabric; and
      a plurality of card sockets, wherein a particular one of the plurality of card sockets includes:
         a first socket, electrically connected to the electrical bus, and configured to receive a first electrical connector of a card of the plurality of cards and electrically connect the first electrical connector to the electrical bus; and
         a conversion device, optically connected to the optical fabric and remaining attached to the backplane when the card is removed from the particular one of the plurality of card sockets, the conversion device comprising:
            a second socket configured to receive a second electrical connector of the card; and
            an optical transceiver configured to:
               convert electrical signals received from the second electrical connector to optical signals and provide the optical signals to the optical fabric; and
               convert optical signals received from the optical fabric to electrical signals and provide the electrical signals to the second electrical connector.

8. The network device of claim 7, wherein the plurality of cards includes:
   at least one control card, wherein the control card performs power and management functions for other ones of the plurality of cards;
   one or more interface cards, wherein a particular one of the one or more interface cards is configured to communicate with another network device; and
   one or more fabric cards, wherein the one or more fabric cards perform switching functions between the one or more interface cards.

9. The network device of claim 8, wherein the at least one control card is connected to the one or more interface cards and to the one or more fabric cards via the electrical bus using the first socket.

10. The network device of claim 8, wherein a first one of the one or more fabric cards is connected to a second one of the one or more fabric cards via the optical fabric using the second socket.

11. The network device of claim 8, wherein a particular one of the one or more fabric cards is connected to a particular one of the one or more interface cards via the optical fabric using the second socket.

12. The network device of claim 7, wherein the conversion device further includes:
 a clock and recovery component;
 an error correction component; and
 an optical coupling to connect the optical transceiver to the optical fabric.

13. The network device of claim 7, wherein the optical fabric comprises:
 a cross-connect assembly of optical fibers, wherein the cross-connect assembly includes an optical fiber connecting the optical transceiver, included in the particular one of the plurality of card sockets, to optical transceivers included in other ones of the plurality of card sockets.

14. The network device of claim 7, wherein the optical fabric comprises:
 a waveguide fabric, wherein the waveguide fabric includes a waveguide connecting the optical transceiver, included in the particular one of the plurality of card sockets, to optical transceivers included in other ones of the plurality of card sockets.

15. A network device comprising:
 a backplane; and
 a plurality of cards connected to the backplane;
 wherein the backplane includes:
  an electrical bus;
  at least one opening;
  a plurality of card sockets, wherein a particular one of the plurality of card sockets is connected to a first connector of a card of the plurality of cards and connects the first connector to the electrical bus; and
 wherein a particular one of the plurality of cards includes a second connector connected to an optical fiber, wherein the optical fiber passes through the at least one opening and connects to another one of the plurality of cards.

16. The network device of claim 15, wherein the second connector includes a first optical connector, wherein the optical fiber includes a second optical connector, and wherein the particular one of the plurality of cards is connected to the optical fiber via an optical connection between the first optical connector and second optical connector.

17. The network device of claim 15, wherein the second connector includes an electrical connector, wherein the optical fiber includes a pluggable optical transceiver, and wherein the particular one of the plurality of cards is connected to the optical fiber via an electrical connection between the electrical connector and the pluggable optical transceiver.

18. The network device of claim 17, wherein the pluggable optical transceiver includes:
 a small form-factor pluggable optical transceiver,
 a 10 Gigabit small form-factor pluggable transceiver, or
 a C form-factor pluggable transceiver.

19. The network device of claim 15, wherein the plurality of cards includes:
 at least one control card, wherein the control card performs power and management functions for other ones of the plurality of cards;
 one or more interface cards, wherein a particular one of the one or more interface cards is configured to communicate with another network device; and
 one or more fabric cards, wherein the one or more fabric cards perform switching functions between the one or more interface cards.

20. The network device of claim 19, wherein a first one of the one or more fabric cards is connected to a second one of the one or more fabric cards via a first optical fiber that passes through the at least one opening, and wherein the first one of the one or more fabric cards is connected to a particular one of the one or more interface cards via a second optical fiber that passes through the at least one opening.

* * * * *